United States Patent
Parker et al.

(10) Patent No.: US 12,469,623 B2
(45) Date of Patent: Nov. 11, 2025

(54) REDUCED CRITICAL RARE EARTH HIGH TEMPERATURE MAGNET

(71) Applicants: UT-Battelle, LLC, Oak Ridge, TN (US); Iowa State University Research Foundation, Inc., Ames, IA (US)

(72) Inventors: David S. Parker, Oak Ridge, TN (US); Brian C. Sales, Lenoir City, TN (US); Benjamin S. Conner, Dayton, OH (US); Tribhuwan Pandey, Antwerp (BE); Andriy Palasyuk, Ames, IA (US); Jun Cui, Ames, IA (US)

(73) Assignees: UT-Battelle, LLC, Oak Ridge, TN (US); Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 17/468,913

(22) Filed: Sep. 8, 2021

(65) Prior Publication Data

US 2022/0076867 A1  Mar. 10, 2022

Related U.S. Application Data

(60) Provisional application No. 63/075,887, filed on Sep. 9, 2020.

(51) Int. Cl.
*H01F 1/057* (2006.01)
*H01F 7/02* (2006.01)
*H01F 41/02* (2006.01)

(52) U.S. Cl.
CPC ........... *H01F 1/0577* (2013.01); *H01F 7/02* (2013.01)

(58) Field of Classification Search
None
See application file for complete search history.

(56) References Cited

U.S. PATENT DOCUMENTS

| 4,597,938 A | 7/1986 | Matsuura et al. |
| 4,684,406 A | 8/1987 | Matsuura et al. |

(Continued)

FOREIGN PATENT DOCUMENTS

CN  104575906 B1  5/2017

OTHER PUBLICATIONS

Hussian (Journal of Alloys and Compounds, 845(2020) 156292, published online Jul. 8, 2020). (Year: 2020).*

(Continued)

*Primary Examiner* — Xiaowei Su
(74) *Attorney, Agent, or Firm* — Scully, Scott, Murphy & Presser, P.C.

(57) ABSTRACT

A permanent magnetic composition comprising the formula:

$$(La_xM_yNd_{1-x-y})_rFe_vM'_zCo_{14-v-z}B_w \quad (1)$$

wherein $0.1 \leq x < 1$, $11 \leq v \leq 14$, $0 \leq y \leq 0.3$, $0 \leq z \leq 0.5$, $1.9 \leq r \leq 3$, $0.1 \leq (x+y) < 1$, $11 \leq (v+z) \leq 14$, and $1.0 \leq w \leq 1.1$, wherein M represents one or more lanthanide elements other than La and Nd, and M' represents one or more transition metal elements other than Fe and Co, or M' represents one or more main group elements other than B; or the permanent magnet may be more particularly described by the formula $(La_xNd_{1-x})_rFe_vCo_{14-v}B_w$ or $LaNdFe_{12}Co_2B$, wherein x, v, and w are defined above. Also described herein are methods for producing the permanent magnet.

16 Claims, 5 Drawing Sheets

(56) References Cited

U.S. PATENT DOCUMENTS

| | | | |
|---|---|---|---|
| 4,770,723 A | 9/1988 | Sagawa et al. | |
| 4,802,931 A | 2/1989 | Croat | |
| 4,851,058 A | 7/1989 | Croat | |
| 4,975,130 A | 12/1990 | Matsuura et al. | |
| 5,056,585 A | 10/1991 | Croat | |
| 10,586,640 B2 | 3/2020 | Paranthaman et al. | |
| 2007/0102069 A1* | 5/2007 | Hidaka | H01F 41/026 148/302 |
| 2011/0095855 A1* | 4/2011 | Kuniyoshi | H01F 1/0577 335/302 |
| 2015/0228386 A1* | 8/2015 | Sakuma | C22C 38/10 419/27 |
| 2015/0279527 A1* | 10/2015 | Suzuki | H02K 1/02 420/83 |
| 2021/0074455 A1* | 3/2021 | Sakuma | H01F 41/0293 |

OTHER PUBLICATIONS

Jurczyk (IEEE Transactions on Magnetics, vol. Mag-22, No. 5, Sep. 1986). (Year: 1986).*

Lei (Journal of Magnetism and Magnetic Materials, 473(2019)155-160). (Year: 2019).*

Pathak, A.K., et al., "Cerium: An Unlikely Replacement of Dysprosium in High Performance Nd-Fe-B Permanent Magnets", Adv. Mater. 2015, Received: Oct. 24, 2014, Revised: Feb. 6, 2015, Published online: Mar. 13, 2015, pp. 2663-2667, 27.

Sagawa, M., et al., "Permanent Magnet Materials Based on the Rare Earth-Iron-Boron Tetragonal Compounds (Invited)", IEEE Transactions on Magnets, Sep. 1984, pp. 1584-1589, vol. Mag 20, No. 5.

Toyota Motor Corporation, "Toyota Develops New Magnet for Electric Motors Aiming to Reduce Use of Critical Rare-Earth Element by up to 50%", https://global.toyota/en/newsroom/corporate/21139684.html, Feb. 2-18, 6 pages.

Brown, D.N., et al., "Substitution of Nd with other rare earth elements in melt spun Nd2Fe14B magnets", AIP Advances (2016), Presented Jan. 12, 2016, received Nov. 20, 2015, accepted Jan. 27, 2016, published online Mar. 10, 2016, pp. 056019-1-056019-6, vol. 6.

Liao, X.F., et al., "Enhanced formation of 2:14:1 phase in La-based rare earth-iron-boron permanent magnetic alloys by Nd substitution", Journal of Magnetism and Magnetic Materials, Received Mar. 27, 2018, Received in revised form May 10, 2018, Accepted May 10, 2018, Available online May 16, 2018, pp. 31-35, vol. 464.

International Search Report and Written Opinion dated Feb. 15, 2022 issued in PCT/US21/49353, 9 pages.

* cited by examiner

REDUCED CRITICAL RARE EARTH HIGH TEMPERATURE MAGNET

CROSS REFERENCE TO RELATED APPLICATION

The present application claims benefit of U.S. Provisional Application No. 63/075,887, filed on Sep. 9, 2020, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates, generally, to permanent magnets with high Curie points and coercivities, and more particularly, to such magnets in which at least lanthanum and neodymium are present. The present invention also relates to methods for producing such magnets.

BACKGROUND OF THE INVENTION

High-performance permanent magnets, i.e., those in which the energy product $BH_{max}$ exceeds 200 kJ/m$^3$, are currently used in a variety of energy-relevant and critical applications, including electric and hybrid electric vehicles, and wind turbines. Other critical applications include motors, generators, medical instruments, and hard disk drives.

With the increasing shift worldwide towards vehicle electrification and carbon-neutral energy sources, the number of machines using these magnets will increase exponentially in the next decades, with attendant increases in the sales and usage of these magnets. Current worldwide demand for high-performance magnets is expected to only increase in coming years.

Presently, the two types of magnets used in critical applications are $Nd_2Fe_{14}B$ ($BH_{max}$ as high as 440 kJ/m$^3$ or 55 MGOe) and $SmCo_5/Sm_2Co_{17}$ ($BH_{max}$ of 200-270 kJ/m$^3$ or 25-34 MGOe). Here, the energy product $BH_{max}$ is a standard measure of magnet strength, and physically represents the amount of magnet energy available to do useful work (such as powering a motor vehicle). However, despite their present usage, both of these magnets suffer from difficulties that limit their utility in applications, making the development of substitutes an important task. $Nd_2Fe_{14}B$ suffers from a comparatively low Curie point of 585 K, meaning that high-temperature magnet usage (typically at temperatures of 400 K and above) runs a substantial risk of demagnetization, wherein the magnet entirely loses its function, which is an unacceptable outcome for any application. To remedy this, many grades of this magnet use the highly expensive dysprosium, which reduces demagnetization, but at a substantial penalty (as much as 30 percent) to the energy product. While $SmCo_5$ does not suffer from this effect, it contains nearly 70 weight percent of cobalt, whose price has become increasingly prohibitive due to its competing usage in lithium-ion batteries. Thus, a magnet free of these deficiencies and that in addition limits the usage of the critical element Nd would represent a key advance in the art of permanent magnets, but thus far, a magnet with these advantages has remained elusive.

SUMMARY OF THE INVENTION

The present disclosure is foremost directed to permanent (hard) ferromagnetic alloy magnetic compositions having exceptional Curie points (typically, well above the 585 K Curie point of commercial $Nd_2Fe_{14}B$) and without reliance on incorporation of Dy and with a substantially lower amount of Co than used in $SmCo_5$. The permanent magnet includes at least lanthanum (La), neodymium (Nd), iron (Fe), cobalt (Co), and boron (B). More particularly, the permanent magnet has the composition $(La_xM_yNd_{1-x-y})_r Fe_vM'_zCo_{14-v-z}B_w$, denoted as Formula (1), wherein $0.1 \leq x < 1$, $11 \leq v \leq 14$, $0 \leq y \leq 0.3$, $0 \leq z \leq 0.5$, $1.9 \leq r \leq 3$, $0.1 \leq (x+y) < 1$, $11 \leq (v+z) \leq 14$, and $1.0 \leq w \leq 1.1$, wherein M represents one or more lanthanide elements other than La and Nd, and M' represents one or more transition metal elements (other than Fe and Co) and/or one or more main group elements. In some embodiments, M is or includes praseodymium (Pr) or other lanthanide element. In some embodiments, M' is or includes copper (Cu) or other transition element, or M' is or includes gallium (Ga) or other main group element. In more particular embodiments, the magnetic composition comprises the formula $(La_xNd_{1-x})_rFe_vCo_{14-v}B_w$, wherein x, v, w, and r are defined above. In a further particular embodiment, the magnetic composition has the formula $LaNdFe_vCo_{14-v}B_w$ or $LaNdFe_{12}Co_2B$. In some embodiments, the permanent magnet excludes Dy or Ce or both.

The magnetic composition described herein substantially reduces expensive, critical rare earth content in high performance magnets while maintaining room temperature magnetic properties. The magnetic composition described herein may have at least 20, 30, 40, or 50% less Nd and no more than 15, 14, 13, 12, 11 or 10 wt % Co. The magnetic composition generally has an increased Curie point relative to the $Nd_2Fe_{14}B$ material and may therefore offer better high temperature performance than $Nd_2Fe_{14}B$ and $SmCo_5$ at a lower cost with more commonly available elements less subject to geopolitical supply risk. The material also affords the possibility, unlike $Nd_2Fe_{14}B$ and $SmCo_5$, for "tuning" of properties for any number of desired applications. In particular applications, the permanent magnet has the composition $LaNdFe_{12}Co_2B$. The permanent magnet may have some of the following exemplary properties: 300 K Magnetization of 1.5 Tesla or higher; Curie point of 700 K or higher; 300 K Anisotropy Field of 5.5 Tesla or higher. The energy product may be 5-55 MG-Ge, or in some cases, about 5-20 MG-Ge, with coercivities as high as 6 kOe or higher. Each of these properties is important in a permanent magnet: i.e., the magnetization sets an upper limit on $BH_{max}$, the Curie point (or ferromagnetic ordering point) determines the usable temperature range of the magnet, and a sufficient anisotropy field (generally a minimum of three times the magnetization) permits subsequent development of sufficient coercivity to prevent demagnetization.

The main role in permanent magnets of rare-earth elements is usually to provide magnetic anisotropy, which is the energetic tendency of magnetic moments to remain aligned in a given direction. It is precisely this tendency, when combined with an effective microstructure, that permits these moments to remain properly oriented under a magnetic field, and thereby, for example, to exert the large traction forces necessary for propulsion of electrified motor vehicles. This is, in fact, the main role of Nd in $Nd_2Fe_{14}B$. The magnetic compositions described herein, such as the alloy $LaNdFe_{12}Co_2B$, may have somewhat lower magnetic anisotropy than $Nd_2Fe_{14}B$, but this anisotropy will likely be sufficient for attainment of a coercivity as large as the saturation magnetization of 1.5 T, given the room temperature anisotropy field of approximately 5.5 T. Notably, this magnetization value is only slightly less than that for $Nd_2Fe_{14}B$ (1.6 T). Given that presently the highest-performing commercially available grade of $Nd_2Fe_{14}B$, at 55 MGOe, is about 86 percent of the theoretical limit of 64 MG-Oe, the presently described magnetic compositions can likely attain energy products of 86 percent of the $LaNdFe_{12}Co_2B$ theoretical limit of 64 MG-Oe, or approximately 51 MG-Oe, which would compete with many current grades of $Nd_2Fe_{14}B$-based magnets.

The maximum 300 K energy product of this material, based on the magnetization, may be, for example, around 450 kJ/m$^3$ or 56 MG-Oe, which exceeds that of most grades of $Nd_2Fe_{14}B$ and all grades of $SmCo_5/Sm_2Co_{17}$. The Curie point of 700 K may be 115 K higher than that of $Nd_2Fe_{14}B$, which extends the potential usable range of the magnet by more than 100 K. In addition, the anisotropy field of 5.5 Tesla, which is nearly four times the magnetization of 1.5 Tesla, is likely sufficient to ensure good coercivity and thereby a large energy product. Based on these properties, the permanent magnet described herein may deliver performance at least equal to that of $Nd_2Fe_{14}B$ and substantially better than that of $SmCo_5$, and at a substantially reduced materials cost. The magnet described herein can therefore effectively remedy the known high-temperature issues with $Nd_2Fe_{14}B$, at lower cost, and in addition, supplant $SmCo_5$ as a high temperature magnet, and achieve this at lower cost.

BRIEF DESCRIPTION OF THE DRAWINGS

FIG. 1A is a graph showing the measured saturation magnetization of $Nd_2Fe_{14}B$ and $LaNdFe_{12}Co_2B$. The scale is such that a value of 30 $\mu_B$/f.u. corresponds to approximately 1.6 Tesla. FIG. 1B is a graph showing the measured anisotropy field of $Nd_2Fe_{14}B$ and $LaNdFe_{12}Co_2B$. Note that 10 kOe equals 1 Tesla.

DETAILED DESCRIPTION OF THE INVENTION

Figure 1A:
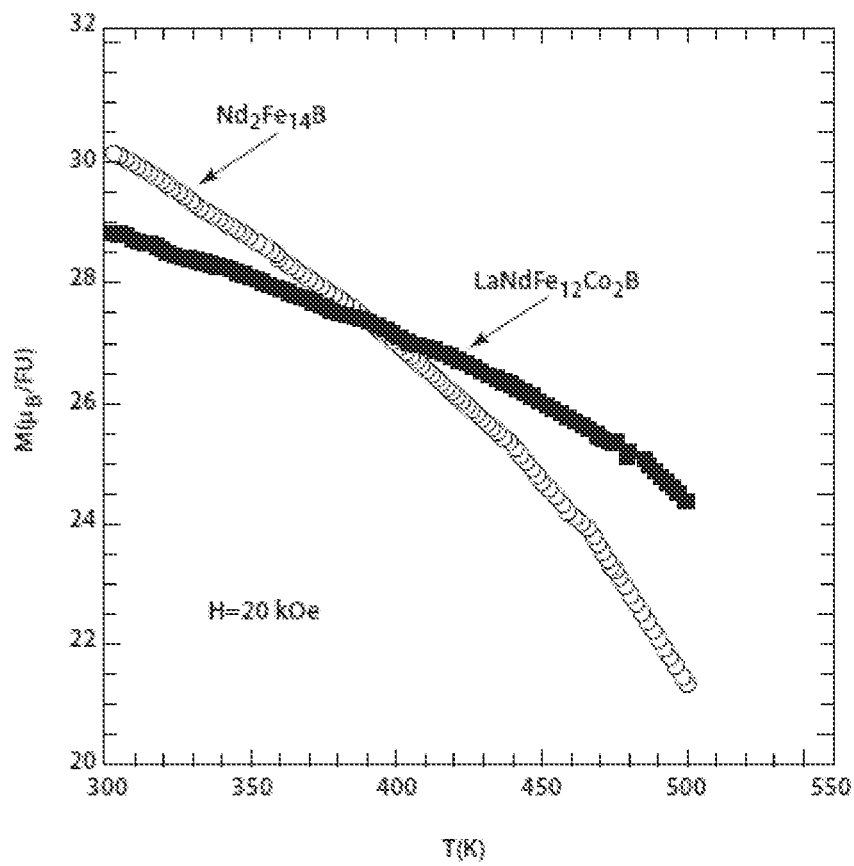
FIGS. 1A-1B.

In one aspect, the present disclosure is directed to a permanent magnet ("magnet") having the formula $(La_xM_yNd_{1-x-y})_rFe_vM'_zCo_{14-v-z}B_w$, also herein denoted as Formula (1) or "formula". In Formula (1) and sub-formulas indicated in this disclosure, the following ranges for variables, x, y, v, z, and w may be as follows: $0.1 \le x < 1$, $11 \le v \le 14$, $0 \le y \le 0.3$, $0 \le z \le 0.5$, $1.9 \le r \le 3$, $0.1 \le (x+y) < 1$, $11 \le (v+z) \le 14$, and $1.0 \le w \le 1.1$, wherein M represents one or more lanthanide elements other than La and Nd, and M' represents one or more transition metal elements (other than Fe and Co) and/or one or more main group elements. The magnet may, in some embodiments, have a composition of the sub-formula $(La_xNd_{1-x})_rFe_vCo_{14-v}B_w$, wherein x, v, w, and r are defined above. In further particular embodiments, the magnetic composition has any of following sub-formulas: $(La_xM_yNd_{1-x-y})_2Fe_vCo_{14-v}B_w$, $(La_xM_yNd_{1-x-y})_{2.2}Fe_vCo_{14-v}B_w$, $(La_xM_yNd_{1-x-y})_{2.4}Fe_vCo_{14-v}B_w$, $(La_xM_yNd_{1-x-y})_{2.6}Fe_vCo_{14-v}B_w$, $(La_xM_yNd_{1-x-y})_{2.8}Fe_vCo_{14-v}B_w$, $(La_xM_yNd_{1-x-y})_3Fe_vCo_{14-v}B_w$, $(La_xNd_{1-x})_2Fe_vCo_{14-v}B_w$, $(La_xNd_{1-x})_{2.2}Fe_vCo_{14-v}B_w$, $(La_xNd_{1-x})_{2.4}Fe_vCo_{14-v}B_w$, $(La_xNd_{1-x})_{2.6}Fe_vCo_{14-v}B_w$, $(La_xNd_{1-x})_{2.8}Fe_vCo_{14-v}B_w$, $(La_xNd_{1-x})_3Fe_vCo_{14-v}B_w$, $LaNdFe_vCo_{14-v}B_w$, or $LaNdFe_{12}Co_2B$. All variables x, y, z, v, w, and r can be any positive numerical value within a stated range, including fractional and integer numbers.

The permanent magnet may, in some embodiments, be denoted as a bulk or macroscopic object, which is larger than a microscopic or nanoscopic object. The permanent magnet considered herein typically has a size of at least 1 millimeter (mm) for at least one of the dimensions of the permanent magnet. In some embodiments, the permanent magnet may have a size of at least 1 centimeter (cm) for at least one of its dimensions. In other embodiments, the permanent magnet may have a size in the micron range, such as obtained by grinding a larger object of the same magnetic composition. The micron-sized magnetic object may be precisely, at least, or more than, for example, 1, 2, 5, 10, 20, 50, or 100 microns.

In some embodiments, the permanent magnet has a planar (layer) shape, generally with a thickness of up to or less than 10 mm, e.g., up to or less than 5, 4, 3, 2, or 1 mm. The magnet may, in one embodiment, have no edges or corners, such as in a smoothened disk or sphere. In other embodiments, the magnet has at least one edge and no corners, such as in an edged disk. In yet other embodiments, the magnet has at least one corner, such as in a parallelepiped, such as a cube, block, or layer shape, or other polyhedral shape.

In Formula (1) or sub-formula, the variable x represents the stoichiometric (molar) amount of lanthanum (La) present in the magnetic composition. In different embodiments, x can be, for example, 0.1, 0.15, 0.2, 0.25, 0.3, 0.35, 0.4, 0.45, 0.5, 0.55, 0.6, 0.65, 0.7, 0.75, 0.8, 0.85, 0.9, or 0.95, or x may have a value within a range bounded by any two of the foregoing values. Any of the foregoing values may be combined to form a range in which one of the values represents a lower bound (minimum) and the other value represents an upper bound (maximum) for x, wherein the lower or upper bound value may be included or excluded from the range. As an example, x having a lower bound of at least 0.25 and an upper bound of up to 0.75 is expressed as $0.25 \le x \le 0.75$, while x having a lower bound of at least 0.25 and an upper bound of less than 0.75 is expressed as $0.25 \le x < 0.75$, while x having a lower bound above 0.25 and an upper bound of up to 0.75 is expressed as $0.25 < x \le 0.75$, while x having a lower bound above 0.25 and an upper bound of less than 0.75 is expressed as $0.25 < x < 0.75$.

The subscript r in Formula (1) has a lower bound of at least or above 1.9 or 2 and an upper bound of up to or less than 3, which is expressed as $1.9 \le r \le 3$ or $2 \le r \le 3$. In some embodiments, $1.9 \le r < 3$, $1.9 < r \le 3$, $1.9 < r < 3$, $2 \le r < 3$, $2 < r \le 3$, or $2 < r < 3$. The subscript r may be, for example, 1.9, 2, 2.1, 2.2, 2.3, 2.4, 2.5, 2.6, 2.7, 2.8, 2.9, or 3, or r may have a value within a range bounded by any two of the foregoing values. Any of the foregoing values may be combined to form a range in which one of the values represents a lower bound (minimum) and the other value represents an upper bound (maximum) for r, wherein the lower or upper bound value may be included or excluded from the range. As an example, r having a lower bound of at least 2 and an upper bound of up to 2.6 is expressed as $2 \le r \le 2.6$, while r having a lower bound of at least 2 and an upper bound of less than 2.6 is expressed as $2 \le r < 2.6$, while r having a lower bound above 2 and an upper bound of up to 2.6 is expressed as 2<r≤2.6, while r having a lower bound above 2 and an upper bound of less than 2.6 is expressed as 2<r<2.6. Similarly, r having a lower bound of at least 2 and an upper bound of up to 2.2 is expressed as 2≤r≤2.2, while r having a lower bound of at least 2 and an upper bound of less than 2.2 is expressed as 2≤r<2.2, while r having a lower bound above 2 and an upper bound of up to 2.2 is expressed as 2<r≤2.2, while r having a lower bound above 2 and an upper bound of less than 2.2 is expressed as 2<r<2.2.

The subscript r can be independently selected from any value in the range 1.9≤r≤3 or 2≤r≤3 or sub-range thereof, and the subscript x can be independently selected from any value in the range 0.1≤x<1 or sub-range thereof, and the two independently selected values of r and x can be combined. For example, x can be in the range 0.25≤x≤0.75 and r can be in the range 1.9≤r≤2.6 or 2≤r≤2.6; or x can be in the range 0.25≤x<0.75 and r can be in the range 1.9≤r≤2.2 or 2≤r≤2.2; or x can be in the range 0.4≤x≤0.6 and r can be in the range 1.9≤r≤2.6 or 2≤r≤2.6; or x can be in the range 0.4≤x≤0.6 and r can be in the range 1.9≤r≤2.2 or 2≤r≤2.2. The subscript r multiplies the value selected for x in Formula (1) by 1.9 or two to three times as set forth by the range 1.9≤r≤3 or 2≤r≤3.

A number of exemplary ranges for x in which x has an upper bound less than 1 are provided as follows: 0.1≤x<1, 0.1<x<1, 0.15≤x<1, 0.15<x<1, 0.2≤x<1, 0.2<x<1, 0.25≤x<1, 0.25<x<1, 0.3≤x<1, 0.3<x<1, 0.35≤x<1, 0.35<x<1, 0.4≤x<1, 0.4<x<1, 0.45≤x<1, 0.45<x<1, 0.5≤x<1, 0.5<x<1, 0.55≤x<1, 0.55<x<1, 0.6≤x<1, 0.6<x<1, 0.65≤x<1, 0.65<x<1, 0.7≤x<1, 0.7<x<1, 0.75≤x<1, 0.75<x<1, 0.8≤x<1, 0.8<x<1, 0.85≤x<1, 0.85<x<1, 0.9≤x<1, 0.9<x<1, 0.95≤x<1, and 0.95<x<1. For any one of the foregoing ranges or specific values of x, r may be within any of the following exemplary ranges: 1.9≤r≤3, 1.9≤r<3, 1.9<r≤3, 1.9<r<3, 1.9≤r≤2.6, 1.9≤r<2.6, 1.9<r≤2.6, 1.9<r<2.6, 1.9≤r≤2.4, 1.9≤r<2.4, 1.9<r≤2.4, 1.9<r<2.4, 1.9≤r≤2.2, 1.9≤r<2.2, 1.9<r≤2.2, 1.9<r<2.2, 2<r≤3, 2<r<3, 2<r≤2.6, 2<r<2.6, 2<r≤2.6, 2<r<2.6, 2<r≤2.4, 2≤r<2.4, 2<r≤2.4, 2<r<2.4, 2≤r<2.2, 2≤r<2.2, 2<r≤2.2, or 2<r<2.2, or the subscript r may specifically be, for example, 1.9, 2, 2.1, 2.2, 2.3, 2.4, 2.5, 2.6, 2.7, 2.8, 2.9, or 3, or r may have a value within a range bounded by any two of the foregoing values. In addition, any of the resulting combination of x and r may be combined with any range or specific value of y, v, z, and w given above or below within this disclosure.

A number of exemplary ranges for x in which x has an upper bound of up to or less than 0.75 are provided as follows: 0.1≤x<0.75, 0.1<x<0.75, 0.1≤x≤0.75, 0.1<x≤0.75, 0.15≤x<0.75, 0.15<x<0.75, 0.15≤x≤0.75, 0.15<x≤0.75, 0.2≤x<0.75, 0.2<x<0.75, 0.2≤x≤0.75, 0.2<x≤0.75, 0.25≤x<0.75, 0.25<x<0.75, 0.25≤x≤0.75, 0.25<x≤0.75, 0.3≤x<0.75, 0.3<x<0.75, 0.3≤x≤0.75, 0.3<x≤0.75, 0.35≤x<0.75, 0.35<x<0.75, 0.35≤x≤0.75, 0.35<x≤0.75, 0.4≤x<0.75, 0.4<x<0.75, 0.4≤x≤0.75, 0.4<x≤0.75, 0.45≤x<0.75, 0.45<x<0.75, 0.45≤x≤0.75, 0.45<x≤0.75, 0.5≤x<0.75, 0.5<x<0.75, 0.5≤x≤0.75, 0.5<x≤0.75, 0.55≤x<0.75, 0.55<x<0.75, 0.55≤x≤0.75, 0.55<x≤0.75, 0.6≤x<0.75, 0.6<x<0.75, 0.6≤x≤0.75, 0.6<x≤0.75, 0.65≤x<0.75, 0.65<x<0.75, 0.65≤x≤0.75, and 0.65<x≤0.75. For any one of the foregoing ranges or specific values of x, r may be within any of the following exemplary ranges: 1.9≤r≤3, 1.9≤r<3, 1.9<r≤3, 1.9<r<3, 1.9≤r≤2.6, 1.9≤r<2.6, 1.9<r≤2.6, 1.9<r<2.6, 1.9≤r≤2.4, 1.9≤r<2.4, 1.9<r≤2.4, 1.9<r<2.4, 1.9≤r≤2.2, 1.9≤r<2.2, 1.9<r≤2.2, 1.9<r<2.2, 2≤r≤3, 2≤r<3, 2<r≤3, 2<r<3, 2≤r≤2.6, 2≤r<2.6, 2<r≤2.6, 2<r<2.6, 2≤r≤2.4, 2≤r<2.4, 2<r≤2.4, 2<r<2.4, 2≤r≤2.2, 2≤r<2.2, 2<r≤2.2, or 2<r<2.2, or the subscript r may specifically be, for example, 1.9, 2, 2.1, 2.2, 2.3, 2.4, 2.5, 2.6, 2.7, 2.8, 2.9, or 3, or r may have a value within a range bounded by any two of the foregoing values. In addition, any of the resulting combination of x and r may be combined with any range or specific value of y, v, z, and w given above or below within this disclosure.

A number of exemplary ranges for x in which x has an upper bound of up to or less than 0.6 are provided as follows: 0.1≤x<0.6, 0.1<x<0.6, 0.1≤x≤0.6, 0.1<x≤0.6, 0.15≤x<0.6, 0.15<x<0.6, 0.15≤x≤0.6, 0.15<x≤0.6, 0.2≤x<0.6, 0.2<x<0.6, 0.2≤x≤0.6, 0.2<x≤0.6, 0.25≤x<0.6, 0.25<x<0.6, 0.25≤x≤0.6, 0.25<x≤0.6, 0.3≤x<0.6, 0.3<x<0.6, 0.3≤x≤0.6, 0.3<x≤0.6, 0.35≤x<0.6, 0.35<x<0.6, 0.35≤x≤0.6, 0.35<x≤0.6, 0.4≤x<0.6, 0.4<x<0.6, 0.4≤x≤0.6, and 0.4<x≤0.6. For any one of the foregoing ranges or specific values of x, r may be within any of the following exemplary ranges: 1.9≤r≤3, 1.9≤r<3, 1.9<r≤3, 1.9<r<3, 1.9≤r≤2.6, 1.9≤r<2.6, 1.9<r≤2.6, 1.9<r<2.6, 1.9≤r≤2.4, 1.9≤r<2.4, 1.9<r≤2.4, 1.9<r<2.4, 1.9≤r≤2.2, 1.9≤r<2.2, 1.9<r≤2.2, 1.9<r<2.2, 2≤r≤3, 2≤r<3, 2<r≤3, 2<r<3, 2≤r≤2.6, 2≤r<2.6, 2<r≤2.6, 2<r<2.6, 2≤r≤2.4, 2≤r<2.4, 2<r≤2.4, 2<r<2.4, 2≤r≤2.2, 2≤r<2.2, 2<r≤2.2, or 2<r<2.2, or the subscript r may specifically be, for example, 1.9, 2, 2.1, 2.2, 2.3, 2.4, 2.5, 2.6, 2.7, 2.8, 2.9, or 3, or r may have a value within a range bounded by any two of the foregoing values. In addition, any of the resulting combination of x and r may be combined with any range or specific value of y, v, z, and w given above or below within this disclosure.

A number of exemplary ranges for x in which x has an upper bound of up to or less than 0.5 are provided as follows: 0.1≤x<0.5, 0.1<x<0.5, 0.1≤x≤0.5, 0.1<x≤0.5, 0.15≤x<0.5, 0.15<x<0.5, 0.15≤x≤0.5, 0.15<x≤0.5, 0.2≤x<0.5, 0.2<x<0.5, 0.2≤x≤0.5, 0.2<x≤0.5, 0.25≤x<0.5, 0.25<x<0.5, 0.25≤x≤0.5, 0.25<x≤0.5, 0.3≤x<0.5, 0.3<x<0.5, 0.3≤x≤0.5, 0.3<x≤0.5, 0.35≤x<0.5, 0.35<x<0.5, 0.35≤x≤0.5, 0.35<x≤0.5, 0.4≤x<0.5, 0.4<x<0.5, 0.4≤x≤0.5, and 0.4<x≤0.5. For any one of the foregoing ranges or specific values of x, r may be within any of the following exemplary ranges: 1.9≤r≤3, 1.9≤r<3, 1.9<r≤3, 1.9<r<3, 1.9≤r≤2.6, 1.9≤r<2.6, 1.9<r≤2.6, 1.9<r<2.6, 1.9≤r≤2.4, 1.9≤r<2.4, 1.9<r≤2.4, 1.9<r<2.4, 1.9≤r≤2.2, 1.9≤r<2.2, 1.9<r≤2.2, 1.9<r<2.2, 2≤r≤3, 2≤r<3, 2<r≤3, 2<r<3, 2≤r≤2.6, 2≤r<2.6, 2<r≤2.6, 2<r<2.6, 2≤r≤2.4, 2≤r<2.4, 2<r≤2.4, 2<r<2.4, 2≤r≤2.2, 2≤r<2.2, 2<r≤0.2, or 2<r<2.2, or the subscript r may specifically be, for example, 1.9, 2, 2.1, 2.2, 2.3, 2.4, 2.5, 2.6, 2.7, 2.8, 2.9, or 3, or r may have a value within a range bounded by any two of the foregoing values. In addition, any of the resulting combination of x and r may be combined with any range or specific value of y, v, z, and w given above or below within this disclosure.

A number of exemplary ranges for x in which x has an upper bound of up to or less than 0.25 are provided as follows: 0.1≤x<0.25, 0.1<x<0.25, 0.1≤x≤0.25, 0.1<x≤0.25, 0.15≤x<0.25, 0.15<x<0.25, 0.15≤x≤0.25, and 0.15<x≤0.25. For any one of the foregoing ranges or specific values of x, r may be within any of the following exemplary ranges: 1.9≤r<3, 1.9≤r≤3, 1.9<r≤3, 1.9<r<3, 1.9≤r≤2.6, 1.9≤r<2.6, 1.9<r≤2.6, 1.9<r<2.6, 1.9≤r≤2.4, 1.9≤r<2.4, 1.9<r≤2.4, 1.9<r<2.4, 1.9≤r≤2.2, 1.9≤r<2.2, 1.9<r≤2.2, 1.9<r<2.2, 2≤r≤3, 2≤r<3, 2<r≤3, or 2<r<3, 2≤r≤2.6, 2≤r<2.6, 2<r≤2.6, or 2<r<2.6, 2≤r≤2.4, 2≤r<2.4, 2<r≤2.4, or 2<r<2.4, 2≤r≤2.2, 2≤r<2.2, 2<r≤2.2, or 2<r<2.2, or the subscript r may specifically be, for example, 1.9, 2, 2.1, 2.2, 2.3, 2.4, 2.5, 2.6, 2.7, 2.8, 2.9, or 3, or r may have a value within a range bounded by any two of the foregoing values. In addition, any of the resulting combination of x and r may be combined with any range or specific value of y, v, z, and w given above or below within this disclosure.

In Formula (1) or sub-formula, M represents one or more lanthanide elements other than La and Nd. M may or may not be present in Formula (1) or sub-formula. The variable y represents the stoichiometric (molar) amount of M present in Formula (1) or sub-formula. The term "lanthanide element" refers to any of the elements having an atomic number of 57-71, e.g., lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). In some embodiments, M is or includes Pr. Thus, M be selected from one or more of Ce, Pr, Pm, Sm, Eu, Gd, Tb, Dy, Ho, Er, Tm, Yb, and Lu. In some embodiments, one or both of Dy and Ce (and/or other lanthanide element, other than La and Nd) are excluded from M, or Dy and/or Ce (and/or other lanthanide element, other than La and Nd) are independently or in sum present in a trace amount (e.g., $0 \leq y \leq 0.1$, $0 \leq y \leq 0.05$, or $0 \leq y \leq 0.01$).

In some embodiments of Formula (1) or sub-formula, y is 0 (i.e., M is not present) or y is greater than 0 (i.e., M is present). In different embodiments, y has a value of, for example, 0, 0.01, 0.02, 0.03, 0.04, 0.05, 0.06, 0.07, 0.08, 0.09, 0.1, 0.15, 0.2, 0.25, or 0.3, or y has a value within a range bounded by any two of the foregoing values. A number of exemplary ranges for y are provided as follows: $0 \leq y \leq 0.3$, $0 < y \leq 0.3$, $0 \leq y < 0.3$, $0 < y < 0.3$, $0 \leq y \leq 0.25$, $0 < y \leq 0.25$, $0 \leq y < 0.25$, $0 < y < 0.25$, $0 \leq y \leq 0.2$, $0 < y \leq 0.2$, $0 \leq y < 0.2$, $0 < y < 0.2$, $0 \leq y \leq 0.15$, $0 < y \leq 0.15$, $0 \leq y < 0.15$, $0 < y < 0.15$, $0 \leq y \leq 0.1$, $0 < y \leq 0.1$, $0 \leq y < 0.1$, $0 < y < 0.1$, $0 \leq y \leq 0.05$, $0 < y \leq 0.05$, $0 \leq y < 0.05$, $0 < y < 0.05$, $0 \leq y \leq 0.01$, $0 < y \leq 0.01$, $0 \leq y < 0.01$, $0 < y < 0.01$, $0.1 \leq y \leq 0.3$, $0.1 < y \leq 0.3$, $0.1 \leq y < 0.3$, $0.1 < y < 0.3$, $0.1 \leq y \leq 0.25$, $0.1 < y \leq 0.25$, $0.1 \leq y < 0.25$, $0.1 < y < 0.25$, $0.1 \leq y \leq 0.2$, $0.1 < y \leq 0.2$, $0.1 \leq y < 0.2$, and $0.1 < y < 0.2$. Notably, any of the foregoing exemplary molar ranges for y can be combined with any of the exemplary molar ranges provided for x and r earlier above.

In Formula (1) or sub-formula, with x and y selected, the molar amount of Nd is known, since, as shown in the formula, the molar amount of Nd is 1-x-y multiplied by value of r. Thus, for example, if x is 0.5 and y is 0.25, the molar amount of Nd is 0.75 multiplied by value of r (e.g., if r is 2, the molar amount of Nd is actually 1.5). Moreover, the sum of x and y should be less than 1 and at least the amount given for x. The range for the sum of x and y can be expressed as $0.1 \leq (x+y) < 1$.

A number of exemplary ranges for (x+y) in which (x+y) has an upper bound less than 1 are provided as follows: $0.1 \leq (x+y) < 1$, $0.1 < (x+y) < 1$, $0.15 \leq (x+y) < 1$, $0.15 < (x+y) < 1$, $0.2 \leq (x+y) < 1$, $0.2 < (x+y) < 1$, $0.25 \leq (x+y) < 1$, $0.25 < (x+y) < 1$, $0.3 \leq (x+y) < 1$, $0.3 < (x+y) < 1$, $0.35 \leq (x+y) < 1$, $0.35 < (x+y) < 1$, $0.4 \leq (x+y) < 1$, $0.4 < (x+y) < 1$, $0.45 \leq (x+y) < 1$, $0.45 < (x+y) < 1$, $0.5 \leq (x+y) < 1$, $0.5 < (x+y) < 1$, $0.55 \leq (x+y) < 1$, $0.55 < (x+y) < 1$, $0.6 \leq (x+y) < 1$, $0.6 < (x+y) < 1$, $0.65 \leq (x+y) < 1$, $0.65 < (x+y) < 1$, $0.7 \leq (x+y) < 1$, $0.7 < (x+y) < 1$, $0.75 \leq (x+y) < 1$, $0.75 < (x+y) < 1$, $0.8 \leq (x+y) < 1$, $0.8 < (x+y) < 1$, $0.85 \leq (x+y) < 1$, $0.85 < (x+y) < 1$, $0.9 \leq (x+y) < 1$, $0.9 < (x+y) < 1$, $0.95 \leq (x+y) < 1$, and $0.95 < (x+y) < 1$.

A number of exemplary ranges for (x+y) in which (x+y) has an upper bound of up to or less than 0.75 are provided as follows: $0.1 \leq (x+y) < 0.75$, $0.1 < (x+y) < 0.75$, $0.1 \leq (x+y) \leq 0.75$, $0.1 < (x+y) \leq 0.75$, $0.15 \leq (x+y) < 0.75$, $0.15 < (x+y) < 0.75$, $0.15 \leq (x+y) \leq 0.75$, $0.15 < (x+y) \leq 0.75$, $0.2 \leq (x+y) < 0.75$, $0.2 < (x+y) < 0.75$, $0.2 \leq (x+y) \leq 0.75$, $0.2 < (x+y) \leq 0.75$, $0.25 \leq (x+y) < 0.75$, $0.25 < (x+y) < 0.75$, $0.25 \leq (x+y) \leq 0.75$, $0.25 < (x+y) \leq 0.75$, $0.3 \leq (x+y) < 0.75$, $0.3 < (x+y) < 0.75$, $0.3 \leq (x+y) \leq 0.75$, $0.3 < (x+y) \leq 0.75$, $0.35 \leq (x+y) < 0.75$, $0.35 < (x+y) < 0.75$, $0.35 \leq (x+y) \leq 0.75$, $0.35 < (x+y) \leq 0.75$, $0.4 \leq (x+y) < 0.75$, $0.4 < (x+y) < 0.75$, $0.4 \leq (x+y) \leq 0.75$, $0.4 < (x+y) \leq 0.75$, $0.45 \leq (x+y) < 0.75$, $0.45 < (x+y) < 0.75$, $0.45 \leq (x+y) \leq 0.75$, $0.45 < (x+y) \leq 0.75$, $0.5 \leq (x+y) < 0.75$, $0.5 < (x+y) < 0.75$, $0.5 \leq (x+y) \leq 0.75$, $0.5 < (x+y) \leq 0.75$, $0.55 \leq (x+y) < 0.75$, $0.55 < (x+y) < 0.75$, $0.55 \leq (x+y) \leq 0.75$, $0.55 < (x+y) \leq 0.75$, $0.6 \leq (x+y) < 0.75$, $0.6 < (x+y) < 0.75$, $0.6 \leq (x+y) \leq 0.75$, $0.6 < (x+y) \leq 0.75$, $0.65 \leq (x+y) < 0.75$, $0.65 < (x+y) < 0.75$, $0.65 \leq (x+y) \leq 0.75$, and $0.65 < (x+y) \leq 0.75$.

A number of exemplary ranges for (x+y) in which (x+y) has an upper bound of up to or less than 0.6 are provided as follows: $0.1 \leq (x+y) < 0.6$, $0.1 < (x+y) < 0.6$, $0.1 \leq (x+y) \leq 0.6$, $0.1 < (x+y) \leq 0.6$, $0.15 \leq (x+y) < 0.6$, $0.15 < (x+y) < 0.6$, $0.15 \leq (x+y) \leq 0.6$, $0.15 < (x+y) \leq 0.6$, $0.2 \leq (x+y) < 0.6$, $0.2 < (x+y) < 0.6$, $0.2 \leq (x+y) \leq 0.6$, $0.2 < (x+y) \leq 0.6$, $0.25 \leq (x+y) < 0.6$, $0.25 < (x+y) < 0.6$, $0.25 \leq (x+y) \leq 0.6$, $0.25 < (x+y) \leq 0.6$, $0.3 \leq (x+y) < 0.6$, $0.3 < (x+y) < 0.6$, $0.3 \leq (x+y) \leq 0.6$, $0.3 < (x+y) \leq 0.6$, $0.35 \leq (x+y) < 0.6$, $0.35 < (x+y) < 0.6$, $0.35 \leq (x+y) \leq 0.6$, $0.35 < (x+y) \leq 0.6$, $0.4 \leq (x+y) < 0.6$, $0.4 < (x+y) < 0.6$, $0.4 \leq (x+y) \leq 0.6$, and $0.4 < (x+y) \leq 0.6$.

A number of exemplary ranges for (x+y) in which (x+y) has an upper bound of up to or less than 0.5 are provided as follows: $0.1 \leq (x+y) < 0.5$, $0.1 \leq (x+y) < 0.5$, $0.1 \leq (x+y) < 0.5$, $0.1 \leq (x+y)$ 0.5, 0.15 $(x+y) < 0.5$, $0.15 < (x+y) < 0.5$, $0.15$ $(x+y)$ $0.5$, $0.15 < (x+y) < 0.5$, $0.2 \leq (x+y) < 0.5$, $0.2 < (x+y) < 0.5$, $0.2 <$ $(x+y)$ $0.5$, $0.2 < (x+y) < 0.5$, $0.25 \leq (x+y) < 0.5$, $0.25 < (x+y) < 0.5$, $0.25 \leq (x+y) < 0.5$, $0.25 < (x+y) < 0.5$, $0.3 < (x+y) < 0.5$, $0.3 < (x+y) < 0.5$, $0.3$ K $(x+y) < 0.5$, $0.3 < (x+y) < 0.5$, $0.35 < (x+y) < 0.5$, $0.35 < (x+y) < 0.5$, $0.35 < (x+y) < 0.5$, $0.35 < (x+y) < 0.5$, $0.4 < (x+y) < 0.5$, $0.4 < (x+y) < 0.5$, $0.4$ K $(x+y) < 0.5$, and $0.4 < (x+y) \leq 0.5$.

A number of exemplary ranges for (x+y) in which (x+y) has an upper bound of up to or less than 0.25 are provided as follows: $0.1 \leq (x+y) < 0.25$, $0.1 < (x+y) < 0.25$, $0.1 \leq (x+y) \leq 0.25$, $0.1 < (x+y) \leq 0.25$, $0.15 \leq (x+y) < 0.25$, $0.15 < (x+y) < 0.25$, $0.15 \leq (x+y) \leq 0.25$, and $0.15 < (x+y) \leq 0.25$.

In some embodiments, the molar amounts of La, M, and Nd, with r factored in, is within the range of 1.9 to 3 or 2 to 3, or stated differently, the product of (1+y) and r, i.e., $r \cdot (1+y)$, is within the range of 1.9 to 3 or 2 to 3. In some embodiments, $1.9 \leq [r \cdot (1+y)] \leq 3$ or $2 \leq [r \cdot (1+y)] \leq 3$, or more specifically, $1.9 \leq [r \cdot (1+y)] < 3$, $1.9 < [r \cdot (1+y)] \leq 3$, $1.9 < [r \cdot (1+y)] < 3$, $1.9 \leq [r \cdot (1+y)] \leq 2.6$, $1.9 \leq [r \cdot (1+y)] < 2.6$, $1.9 < [r \cdot (1+y)] \leq 2.6$, $1.9 < [r \cdot (1+y)] < 2.6$, $1.9 \leq [r \cdot (1+y)] \leq 2.4$, $1.9 \leq [r \cdot (1+y)] < 2.4$, $1.9 < [r \cdot (1+y)] \leq 2.4$, $1.9 < [r \cdot (1+y)] < 2.4$, $1.9 \leq [r \cdot (1+y)] \leq 2.2$, $1.9 \leq [r \cdot (1+y)] < 2.2$, $1.9 < [r \cdot (1+y)] \leq 2.2$, $1.9 < [r \cdot (1+y)] < 2.2$, $2 \leq [r \cdot (1+y)] < 3$, $2 < [r \cdot (1+y)] \leq 3$, $2 < [r \cdot (1+y)] < 3$, $2 \leq [r \cdot (1+y)] \leq 2.6$, $2 \leq [r \cdot (1+y)] < 2.6$, $2 < [r \cdot (1+y)] \leq 2.6$, $2 < [r \cdot (1+y)] < 2.6$, $2 \leq [r \cdot (1+y)] \leq 2.4$, $2 \leq [r \cdot (1+y)] < 2.4$, $2 < [r \cdot (1+y)] \leq 2.4$, $2 < [r \cdot (1+y)] < 2.4$, $2 \leq [r \cdot (1+y)] \leq 2.2$, $2 \leq [r \cdot (1+y)] < 2.2$, $2 < [r \cdot (1+y)] \leq 2.2$, or $2 < [r \cdot (1+y)] < 2.2$. In addition, any of the foregoing values of $r \cdot (1+y)$ may be combined with any range or specific value of x, y, r, v, z, and w given above or below within this disclosure, or any of the foregoing values of $r \cdot (1+y)$ may apply to any of the formulas or sub-formulas recited within this disclosure.

In Formula (1) or sub-formula, the variable v represents the stoichiometric (molar) amount of iron (Fe) present in the magnetic composition. In different embodiments, v has a value of, for example, 11, 11.5, 12, 12.5, 13, 13.5, or 14, or v has a value within a range bounded by any two of the foregoing values. A number of exemplary ranges for v are provided as follows: $11 \leq v \leq 14$, $11 < v \leq 14$, $11 \leq v < 14$, $11 < v < 14$, $11 \leq v \leq 13.9$, $11 < v \leq 13.9$, $11 \leq v < 13.9$, $11 < v < 13.9$, $11 \leq v \leq 13.8$, $11 < v \leq 13.8$, $11 \leq v < 13.8$, $11 < v < 13.8$, $11 \leq v \leq 13.5$, $11 < v \leq 13.5$, $11 \leq v < 13.5$, $11 < v < 13.5$, $11 \leq v \leq 13$, $11 < v \leq 13$, $11 \leq v < 13$, $11 < v < 13$, $11 \leq v \leq 12.5$, $11 < v \leq 12.5$, $11 \leq v < 12.5$, $11 < v < 12.5$, $11 \leq v \leq 12$, $11 < v \leq 12$, $11 \leq v < 12$, $11 < v < 12$, $11.5 \leq v \leq 14$, $11.5 < v \leq 14$, $11.5 \leq v < 14$, $11.5 < v < 14$, $11.5 \leq v \leq 13.5$, $11.5 < v \leq 13.5$, $11.5 \leq v < 13.5$, $11.5 < v < 13.5$, $11.5 \leq v \leq 13$, $11.5 < v \leq 13$, $11.5 \leq v < 13$, $11.5 < v < 13$, $11.5 \leq v \leq 12.5$, $11.5 < v \leq 12.5$, $11.5 \leq v < 12.5$, $11.5 < v < 12.5$, $11.5 \leq v \leq 12$, $11.5 < v \leq 12$, $11.5 \leq v < 12$, $11.5 < v < 12$, $11.8 \leq v \leq 14$, $11.8 < v \leq 14$, $11.8 \leq v < 14$, $11.8 < v < 14$, $11.8 \leq v \leq 13.5$, $11.8 < v \leq 13.5$, $11.8 \leq v < 13.5$, $11.8 < v < 13.5$, $11.8 \leq v \leq 13$, $11.8 < v \leq 13$, $11.8 \leq v < 13$, $11.8 < v < 13$, $11.8 \leq v \leq 12.5$, $11.8 < v \leq 12.5$, $11.8 \leq v < 12.5$, $11.8 < v < 12.5$, $11.8 \leq v \leq 12$, $11.8 < v \leq 12$, $11.8 \leq v < 12$, $11.8 < v < 12$, $11.8 \leq v \leq 12.2$, $11.8 < v \leq 12.2$, $11.8 \leq v < 12.2$, $11.8 < v < 12.2$, $12 \leq v \leq 14$, $12 < v \leq 14$, $12 \leq v < 14$, $12 < v < 14$, $12 \leq v \leq 13.5$, $12 < v \leq 13.5$, $12 \leq v < 13.5$, $12 < v < 13.5$, $12 \leq v \leq 13$, $12 < v \leq 13$, $12 \leq v < 13$, $12 < v < 13$, $12 \leq v \leq 12.5$, $12 < v \leq 12.5$, $12 \leq v < 12.5$, $12 < v < 12.5$, $12.5 \leq v \leq 14$, $12.5 < v \leq 14$, $12.5 \leq v < 14$, $12.5 < v < 14$, $12.5 \leq v \leq 13.5$, $12.5 < v \leq 13.5$, $12.5 \leq v < 13.5$, $12.5 < v < 13.5$, $12.5 \leq v \leq 13$, $12.5 < v \leq 13$, $12.5 \leq v < 13$, $12.5 < v < 13$, $13 \leq v \leq 14$, $13 < v \leq 14$, $13 \leq v < 14$, $13 < v < 14$, $13 \leq v \leq 13.9$, $13 < v \leq 13.9$, $13 \leq v < 13.9$, $13 < v < 13.9$, $13 \leq v \leq 13.8$, $13 < v \leq 13.8$, $13 \leq v < 13.8$, $13 < v < 13.8$, $13 \leq v \leq 13.5$, $13 < v \leq 13.5$, $13 \leq v < 13.5$, and $13 < v < 13.5$.

M' represents one or more transition metal elements (other than Fe and Co) and/or M' represents one or more main group elements. The variable z represents the stoichiometric (molar) amount of M' present in the magnetic composition. In Formula (1) or sub-formula, M' may be present (i.e., when z is greater than 0) or may not be present (i.e., when z is 0). The term "transition metal element" refers to any of the elements of Groups 3-12 of the Periodic Table, and may be a first, second, or third row transition metal. Some examples of first row transition metal elements (other than Fe and Co) include, for example, scandium (Sc), titanium (Ti), vanadium (V), chromium (Cr), manganese (Mn), nickel (Ni), copper (Cu), and zinc (Zn). Some examples of second row transition metal elements include yttrium (Y), zirconium (Zr), niobium (Nb), molybdenum (Mo), and ruthenium (Ru). Some examples of third row transition metal elements include hafnium (Hf), tantalum (Ta), tungsten (W), and rhenium (Re). In some embodiments, M' is or includes copper (Cu). In some embodiments, a transition metal other than Fe and Co is excluded from M', or one or more transition metals other than Fe and Co is/are independently or in sum present in a trace amount (e.g., $0 \leq z \leq 0.1$, $0 \leq z \leq 0.05$, or $0 \leq z \leq 0.01$). The term "main group element" refers to any of the elements in Groups 13 and 14 of the Periodic Table of the Elements, except that M' does not include boron (B), since B is explicitly included in Formula (1) and sub-formulas. Some examples of main group elements in Group 13 include aluminum (Al), gallium (Ga), and indium (In). Some examples of main group elements in Group 14 include silicon (Si), germanium (Ge), and tin (Sn). Generally, M' does not include carbon (C) as a main group element. In some embodiments, one or more main group elements is/are independently or in sum present in a trace amount (e.g., $0 \leq z \leq 0.1$, $0 \leq z \leq 0.05$, or $0 \leq z \leq 0.01$). In some embodiments, any of the foregoing classes or individual species of transition metal and/or main group element may be excluded from the magnetic composition.

In some embodiments of Formula (1) or sub-formula, z is 0 (i.e., M' is not present) or z is greater than 0 (i.e., M' is present). In different embodiments, z has a value of, for example, 0, 0.01, 0.02, 0.03, 0.04, 0.05, 0.06, 0.07, 0.08, 0.09, 0.1, 0.15, 0.2, 0.25, 0.3, 0.35, 0.4, 0.45, or 0.5, or z has a value within a range bounded by any two of the foregoing values. A number of exemplary ranges for z are provided as follows. $0 \leq z \leq 0.5$, $0 < z \leq 0.5$, $0 \leq z < 0.5$, $0 < z < 0.5$, $0 \leq z \leq 0.45$, $0 < z \leq 0.45$, $0 \leq z < 0.45$, $0 < z < 0.45$, $0 \leq z \leq 0.4$, $0 < z \leq 0.4$, $0 \leq z < 0.4$, $0 < z < 0.4$, $0 \leq z \leq 0.35$, $0 < z \leq 0.35$, $0 \leq z < 0.35$, $0 < z < 0.35$, $0 \leq z \leq 0.3$, $0 < z \leq 0.3$, $0 \leq z < 0.3$, $0 < z < 0.3$, $0 \leq z \leq 0.2$, $0 < z \leq 0.2$, $0 \leq z < 0.2$, $0 < z < 0.2$, $0 \leq z \leq 0.1$, $0 < z \leq 0.1$, $0 \leq z < 0.1$, $0 < z < 0.1$, $0 \leq z \leq 0.05$, $0 < z \leq 0.05$, $0 \leq z < 0.05$, $0 < z < 0.05$, $0 \leq z \leq 0.01$, $0 \leq z \leq 0.01$, $0 < z \leq 0.01$, $0 < z < 0.01$, $0.1 \leq z \leq 0.6$, $0.1 < z \leq 0.6$, $0.1 \leq z < 0.6$, $0.1 < z < 0.6$, $0.1 \leq z \leq 0.5$, $0.1 < z \leq 0.5$, $0.1 \leq z < 0.5$, $0.1 < z < 0.5$, $0.1 \leq z \leq 0.4$, $0.1 < z \leq 0.4$, $0.1 \leq z < 0.4$, $0.1 < z < 0.4$, $0.1 \leq z \leq 0.3$, $0.1 < z \leq 0.3$, $0.1 \leq z < 0.3$, $0.1 < z < 0.3$, $0.1 \leq z \leq 0.2$, $0.1 < z \leq 0.2$, $0.1 \leq z < 0.2$, and $0.1 < z < 0.2$. Notably, any of the foregoing exemplary molar ranges for z can be combined with any of the exemplary molar ranges provided for v earlier above, and these combination of values can, in turn, be combined with any of the exemplary molar ranges provided for r, x and y earlier above.

In Formula (1) or sub-formula, with v and z selected, the molar amount of Co is known, since, as shown in the formula, the molar amount of Co is $14-v-z$. Thus, for example, if v is 11 and z is 1, the molar amount of Co is 2. Moreover, the sum of v and z should be no more than 14 and at least the amount given for v. The range for the sum of v and z can be expressed as $11 \leq (v+z) \leq 14$, $11 < (v+z) \leq 14$, $11 \leq (v+z) < 14$, $11 < (v+z) < 14$, $11 \leq (v+z) \leq 13.9$, $11 < (v+z) \leq 13.9$, $11 \leq (v+z) < 13.9$, $11 < (v+z) < 13.9$, $11 \leq (v+z) \leq 13.8$, $11 < (v+z) \leq 13.8$, $11 \leq (v+z) < 13.8$, $11 < (v+z) < 13.8$, $11 \leq (v+z) \leq 13.5$, $11 < (v+z) \leq 13.5$, $11 \leq (v+z) < 13.5$, $11 < (v+z) < 13.5$, $11 \leq (v+z) \leq 13$, $11 < (v+z) \leq 13$, $11 \leq (v+z) < 13$, $11 < (v+z) < 13$, $11 \leq (v+z) \leq 12.5$, $11 < (v+z) \leq 12.5$, $11 \leq (v+z) < 12.5$, $11 < (v+z) < 12.5$, $11 \leq (v+z) \leq 12$, $11 < (v+z) \leq 12$, $11 \leq (v+z) < 12$, $11 < (v+z) < 12$, $11.5 \leq (v+z) \leq 14$, $11.5 < (v+z) \leq 14$, $11.5 \leq (v+z) < 14$, $11.5 < (v+z) < 14$, $11.5 \leq (v+z) \leq 13.5$, $11.5 < (v+z) \leq 13.5$, $11.5 \leq (v+z) < 13.5$, $11.5 < (v+z) < 13.5$, $11.5 \leq (v+z) \leq 13$, $11.5 < (v+z) \leq 13$, $11.5 \leq (v+z) < 13$, $11.5 < (v+z) < 13$, $11.5 \leq (v+z) \leq 12.5$, $11.5 < (v+z) \leq 12.5$, $11.5 \leq (v+z) < 12.5$, $11.5 < (v+z) < 12.5$, $11.5 \leq (v+z) \leq 12$, $11.5 < (v+z) \leq 12$, $11.5 \leq (v+z) < 12$, $11.5 < (v+z) < 12$, $11.8 \leq (v+z) \leq 14$, $11.8 < (v+z) \leq 14$, $11.8 \leq (v+z) < 14$, $11.8 < (v+z) < 14$, $11.8 \leq (v+z) \leq 13.5$, $11.8 < (v+z) \leq 13.5$, $11.8 \leq (v+z) < 13.5$, $11.8 < (v+z) < 13.5$, $11.8 \leq (v+z) \leq 13$, $11.8 < (v+z) \leq 13$, $11.8 \leq (v+z) < 13$, $11.8 < (v+z) < 13$, $11.8 \leq (v+z) \leq 12.5$, $11.8 < (v+z) \leq 12.5$, $11.8 \leq (v+z) < 12.5$, $11.8 < (v+z) < 12.5$, $11.8 \leq (v+z) \leq 12$, $11.8 < (v+z) \leq 12$, $11.8 \leq (v+z) < 12$, $11.8 < (v+z) < 12$, $11.8 \leq (v+z) \leq 12.2$, $11.8 < (v+z) \leq 12.2$, $11.8 \leq (v+z) < 12.2$, $11.8 < (v+z) < 12.2$, $12 \leq (v+z) \leq 14$, $12 < (v+z) \leq 14$, $12 \leq (v+z) < 14$, $12 < (v+z) < 14$, $12 K (v+z) \leq 13.5$, $12 \leq (v+z) \leq 13.5$, $12 (v+z) < 13.5$, $12 < (v+z) < 13.5$, $12 \leq (v+z) \leq 13$, $12 < (v+z) \leq 13$, $12 \leq (v+z) < 13$, $12 < (v+z) < 13$, $12 \leq (v+z) \leq 12.5$, $12 < (v+z) \leq 12.5$, $12 \leq (v+z) < 12.5$, $12 < (v+z) < 12.5$, $12 < (v+z) < 12.5$, $12.5 \leq (v+z) \leq 14$, $12.5 < (v+z) \leq 14$, $12.5 \leq (v+z) < 14$, $12.5 < (v+z) < 14$, $12.5 \leq (v+z) \leq 13.5$, $12.5 < (v+z) \leq 13.5$, $12.5 \leq (v+z) < 13.5$, $12.5 < (v+z) < 13.5$, $12.5 \leq (v+z) \leq 13$, $12.5 < (v+z) \leq 13$, $12.5 \leq (v+z) < 13$, $12.5 < (v+z) < 13$, $13 \leq (v+z) \leq 14$, $13 < (v+z) \leq 14$, $13 \leq (v+z) < 14$, $13 < (v+z) < 14$, $13 \leq (v+z) \leq 13.9$, $13 < (v+z) \leq 13.9$, $13 \leq (v+z) < 13.9$, $13 < (v+z) < 13.9$, $13 \leq (v+z) \leq 13.8$, $13 < (v+z) \leq 13.8$, $13 \leq (v+z) < 13.8$, $13 < (v+z) < 13.8$, $13 \leq (v+z) \leq 13.5$, $13 < (v+z) \leq 13.5$, $13 \leq (v+z) < 13.5$, and $13 < (v+z) < 13.5$.

In Formula (1) or sub-formula, the molar amount of B is typically within a range of 1.0 to 1.1. That is, $1.0 \leq w \leq 1.1$, or in some embodiments, $1.0 \leq w < 1.1$, $1.0 < w \leq 1.1$, or $1.0 < w < 1.1$. In various embodiments, w may have a value of 1.01, 1.02, 1.03, 1.04, 1.05, 1.06, 1.07, 1.08, 1.09, or 1.1, or w may be within a range bounded by any two of the foregoing values.

As a first example, if x is 0.5 and y is 0 (which excludes M) and r is 2, Formula (1) can be expressed as $(La_{0.5}Nd_{0.5})_2Fe_vM'_zCo_{14-v-z}B_w$, which reduces to $LaNdFe_vM'_zCo_{14-v-z}B_w$, wherein v, z, and w may also be independently selected. In the foregoing example, if M is present, Formula (1) can be expressed as $(La_{0.5}M_yNd_{0.5})_2Fe_vM'_zCo_{14-v-z}B_w$, which reduces to $LaM_{2y}NdFe_vM'_zCo_{14-v-z}B_w$, wherein y, v, z, and w may also be independently selected, and wherein any range in r·(1+y), as provided earlier above, may apply.

As a second example, if x is 0.5 and y is 0 (which excludes M) and r is 2.2, Formula (1) can be expressed as $(La_{0.5}Nd_{0.5})_{2.2}Fe_vM'_zCo_{14-v-z}B_w$, which reduces to $La_{1.1}Nd_{1.1}Fe_vM'_zCo_{14-v-z}B_w$, wherein v, z, and w may also be independently selected. In the foregoing example, if M is present, Formula (1) can be expressed as $(La_{0.5}M_y Nd_{0.5})_{2.2}Fe_vM'_zCo_{14-v-z}B_w$, which reduces to $La_{1.1}M_{2.2y}Nd_{1.1}Fe_vM'_zCo_{14-v-z}B_w$, wherein y, v, z, and w may also be independently selected, and wherein any range in r·(1+y), as provided earlier above, may apply.

As a third example, if x is 0.5 and y is 0 (which excludes M) and r is 2.6, Formula (1) can be expressed as $(La_{0.5}Nd_{0.5})_{2.6}Fe_vM'_zCo_{14-v-z}B_w$, which reduces to $La_{1.3}Nd_{1.3}Fe_vM'_zCo_{14-v-z}B_w$, wherein v, z, and w may also be independently selected. In the foregoing example, if M is present, Formula (1) can be expressed as $(La_{0.5}M_y Nd_{0.5})_{2.6}Fe_vM'_zCo_{14-v-z}B_w$, which reduces to $La_{1.3}M_{2.6y}Nd_{1.3}Fe_vM'_zCo_{14-v-z}B_w$, wherein y, v, z, and w may also be independently selected, and wherein any range in r·(1+y), as provided earlier above, may apply.

As a fourth example, if x is 0.25 and y is 0 (which excludes M) and r is 2, Formula (1) can be expressed as $(La_{0.25}Nd_{0.75})_2Fe_vM'_zCo_{14-v-z}B_w$, which reduces to $La_{0.5}Nd_{1.5}Fe_vM'_zCo_{14-v-z}B_w$, wherein v, z, and w may also be independently selected.

As a fifth example, if x is 0.25 and y is 0 (which excludes M) and r is 2.2, Formula (1) can be expressed as $(La_{0.25}Nd_{0.75})_{2.2}Fe_vM'_zCo_{14-v-z}B_w$, which reduces to $La_{0.55}Nd_{1.65}Fe_vM'_zCo_{14-v-z}B_w$, wherein v, z, and w may also be independently selected.

As a sixth example, if x is 0.25 and y is 0 (which excludes M) and r is 2.6, Formula (1) can be expressed as $(La_{0.25}Nd_{0.75})_{2.6}Fe_vM'_zCo_{14-v-z}B_w$, which reduces to $La_{0.65}Nd_{1.95}Fe_vM'_zCo_{14-v-z}B_w$, wherein v, z, and w may also be independently selected.

As a seventh example, if x is 0.75 and y is 0 (which excludes M) and r is 2, Formula (1) can be expressed as $(La_{0.75}Nd_{0.25})_2Fe_vM'_zCo_{14-v-z}B_w$, which reduces to $La_{1.5}Nd_{0.5}Fe_vM'_zCo_{14-v-z}B_w$, wherein v, z, and w may also be independently selected.

As an eighth example, if x is 0.75 and y is 0 (which excludes M) and r is 2.2, Formula (1) can be expressed as $(La_{0.75}Nd_{0.25})_{2.2}Fe_vM'_zCo_{14-v-z}B_w$, which reduces to $La_{1.65}Nd_{0.55}Fe_vM'_zCo_{14-v-z}B_w$, wherein v, z, and w may also be independently selected.

As a ninth example, if x is 0.75 and y is 0 (which excludes M) and r is 2.6, Formula (1) can be expressed as $(La_{0.75}Nd_{0.25})_{2.6}Fe_vM'_zCo_{14-v-z}B_w$, which reduces to $La_{1.95}Nd_{0.65}Fe_vM'_zCo_{14-v-z}B_w$, wherein v, z, and w may also be independently selected.

In some of the foregoing examples, M was excluded for the sake of clarity. However, in any of the foregoing examples, M may be included in the range given for y, i.e., 0≤y≤0.3. For example, if x is 0.5, y is 0.2, and r is 2, Formula (1) can be expressed as $(La_{0.5}M_{0.2}Nd_{0.5})_2Fe_vM'_zCo_{14-v-z}B_w$, which reduces to $LaM_{0.4}NdFe_vM'_zCo_{14-v-z}B_w$, wherein v, z, and w may also be independently selected, and wherein any range in r·(1+y), as provided earlier above, may apply.

The magnetic compositions of Formula (1) may alternatively be expressed by the following formula: $La_aM_bNd_cFe_vM'_zCo_{14-v-z}B_w$, denoted as Formula (2). In Formula (2), 0.2≤a≤2.5, 0≤b≤0.6, 0.2≤c≤2.5, wherein sum of (a+b+c)≤3 or<3, or≤2.8, or≤2.6, or≤2.4, or≤2.2, or≤2, and wherein M, M', v, z, and w are as described earlier above.

Subscript a may be, for example, 0.2, 0.25, 0.3, 0.4, 0.5, 0.6, 0.7, 0.75, 0.8, 0.9, 1, 1.1, 1.2, 1.3, 1.4, 1.5, 1.6, 1.7, 1.8, 1.9, 2, 2.1, 2.2, 2.3, 2.4, or 2.5, or subscript a may be within a range bounded by any two of the foregoing values. Subscript b may be, for example, 0, 0.1, 0.15, 0.2, 0.25, 0.3, 0.35, 0.4, 0.45, 0.5, 0.55, 0.6, or subscript b may be within a range bounded by any two of the foregoing values. Subscript c may be, for example, 0.2, 0.25, 0.3, 0.4, 0.5, 0.6, 0.7, 0.75, 0.8, 0.9, 1, 1.1, 1.2, 1.3, 1.4, 1.5, 1.6, 1.7, 1.8, 1.9, 2, 2.1, 2.2, 2.3, 2.4, or 2.5, or subscript c may be within a range bounded by any two of the foregoing values. Any range or particular value of variable a selected from the above list may be combined with any range or particular value of variables b and c selected from the above list, and these in turn may be combined with any range or particular value of v, z, and w recited in this disclosure.

The magnetic composition according to Formula (1) or sub-formula therein may have one or more acceptable or exceptional magnetic properties. Some examples of magnetic properties include Curie point, energy product, coercivity, magnetization, and anisotropy field. The magnetic composition typically exhibits a Curie point greater than 585 K, and in some embodiments, the Curie point is at least or above 600 K, 650 K, 700 K, 725 K, or 750 K. The magnetic composition typically exhibits an energy product (magnetic strength) of at least or above 5, 10, or 15 MG-Oe (where MG-Oe=Megagauss-Oersted), and in some embodiments, the energy product is at least or above 20, 25, 30, 35, 40, 45, 50, or 55 MG-Ge. The magnetic composition typically exhibits a coercivity of at least or above 2, 3, 4, or 5 kOe, and in some embodiments, the coercivity is at least or above 6, 8, 10, 12, 15, 20, 25, 30, 35, or 40 kOe. The magnetic composition typically exhibits a magnetization of at least or above 0.8 or 0.9 T (where T=Tesla), and in some embodiments, the magnetization is at least or above 1, 1.1, 1.2, 1.3, 1.4, 1.5, or 1.6 T (room temperature values). To convert T to kilogauss (kG), multiply by the foregoing values by 10. The magnetic composition typically exhibits an anisotropy field of at least 0.5 or 1 T, and in some embodiments, the anisotropy field is at least or above 2, 3, 4, 5, 6, 7, 8, 9, 10, 11, or 12 T (or 5-120 kOe).

In another aspect, the present disclosure is directed to a method for producing the above-described permanent magnet. Any of the known methods for producing alloys containing a combination of lanthanide and transition metal elements can be used for producing compositions according to Formula (1). In a typical method, stoichiometric quantities of all elements to be included in the formula are melted together (e.g., by arc-melting, vacuum melting, or plasma melting) followed by annealing the melt, typically under a low-oxygen or completely inert gas atmosphere. The inert gas may be, e.g., argon or nitrogen. The annealing step may employ a temperature of, typically, at least 700° C., 800° C., 900° C., or 1000° C., for a period of at least 24 hours, 48 hours, 72 hours, or a week.

Examples have been set forth below for the purpose of illustration and to describe certain specific embodiments of the invention. However, the scope of this invention is not to be in any way limited by the examples set forth herein.

EXAMPLES

As is well-known, for magnets relying upon magnetocrystalline (as opposed to shape) anisotropy for their coercivity, there are a set of intrinsic atomic-level properties that characterize the potential of the permanent magnet material to achieve high magnetic performance, measured as the energy product $BH_{max}$. These properties—magnetization, Curie point, and magnetic anisotropy—exist independent of the particular microstructure whose optimization forms the basis of most efforts to develop coercivity. They can, in fact, be calculated with reasonable accuracy from first principles, if sufficient care is taken.

These intrinsic properties form a necessary but not sufficient set of characteristics for a given material to be considered as a viable permanent magnet which can be made in any shape, resistant to self-demagnetization. The experimental effort to develop coercivity, discussed in the next section, is a wholly distinct task for which few generally applicable methods are known. However, without sufficient magnetic anisotropy, efforts to develop coercivity are of limited value as the coercivity generally does not exceed some small fraction (a quarter or at most a third) of the anisotropy field $H_A$. Since one generally desires a coercivity Hc as large as the magnetization $M_s$, this sets a plausible requirement that HA exceed 3 $M_s$, while noting that all these entities are temperature dependent.

Experimental Methods

Intrinsic Property Measurement

Polycrystalline samples of $LaNdFe_{12}Co_2B$ and $Nd_2Fe_{14}B$ were produced by arc-melting the stoichiometric quantities of elements together followed by annealing each sample in a sealed silica ampoule filled with one-third atmosphere of argon for 1 week at 800° C. The resulting material showed only the $Nd_2Fe_{14}B$ structure, although the x-ray peaks for the $LaNdFe_{12}Co_2B$ were slightly broader. However, careful chemical analysis using a Hitachi™ TM3000 electron microscope with a Bruker™ Quantax 70 energy dispersive x-ray analysis system revealed some composition modulation for the $LaNdFe_{12}Co_2B$ sample consisting of La and Nd rich regions a few microns in size.

The polycrystalline samples were mechanically ground into a fine powder (approximately 10 microns), and small quantities of each composition were prepared for magnetic measurements. The temperature dependence of the saturation magnetization for each composition was determined by loosely placing a few milligrams of powder into a quartz tube. The quartz tube was loaded into a SQUID magnetometer equipped with a high temperature capability (300 K-800K). A 20 kOe magnetic field was applied, which caused the individual particles to rotate such that the easy axis was aligned with the magnetic field. The values of the magnetization as the temperature was increased to 500 K were taken as the saturation magnetization for each temperature. The results of this measurement are shown in FIG. 1A. The good agreement between the data shown in FIG. 1A for $Nd_2Fe_{14}B$ with the well-established values from the literature serve as a check of this method.

To estimate the magnetic anisotropy field, a few milligrams of each powder was carefully mixed into a low-viscosity epoxy, and the mixture subjected to a magnetic field from 5kOe to 4 tesla. The epoxy was then gently heated to 383 K overnight to harden the epoxy. A bar-shaped sample ($\approx$2×2×6 mm) was cut from the epoxy so that the long dimension was perpendicular to the direction of the applied magnetic field. The bar-shaped sample was snuggly fitted into a quartz tube so that the sample could not rotate in an applied magnetic field. At temperatures above 425 K, the saturation magnetization at the highest applied field (70 kOe) could be used with the temperature calibration data in FIG. 1A to determine the mass of magnetic material in each bar-shaped sample. From the M(H) curves at various temperatures between 300 and 500 K, the anisotropy field was estimated in the standard manner. The error bars in the data shown in FIG. 1B result from the imperfect alignment of the powder.

Magnet Sample Measurement—1

High purity La (MPC LaM012, >99.9% metal basis), Nd (MPC NdM-008, >99.9% metal basis), Fe (Aremco MPC>99.99%), Co (AEE MPC>99.99%), and B (Alfa, N24B031, >99.5%) were mixed according to the formula $(La_{0.5}Nd_{0.5})_{2.2}Fe_{12}Co_2B_{1.1}$. The mixture of raw materials were arc-melted three times under a 0.6 ATM ultra-high purity argon. The obtained ingot was placed in a quartz crucible with 0.81 mm orifice diameter and heated to 1375° C. with a 250 kHz induction system under 0.3 ATM ultra-high purity helium. The melt was ejected on a solid copper wheel rotating at 25 m/s with 250 Torr overhead pressure. Melt-spun ribbons of $LaNdFe_{12}Co_2B$ were sealed in tantalum lined quartz ampules and annealed at a temperature of 575° C. for periods of 15 and 30 minutes, then furnace cooled. The treated ribbon was directly placed on PPMS sample holder for measurement of its magnetic properties.

Magnet Sample Measurement—2

An ingot with composition $(Nd_{0.75}La_{0.25})_{2.6}Ga_{0.1}Co_2Fe_{11.9}B_{1.06}$ was obtained by induction melting, then cast into a Cu mold cooled with chill water. The ingot was then induction melted again and melt-spun with the Cu wheel speed set at 2 m/s to obtain strips without any Fe precipitation. The strips were hydrogen-decrepitated at a pressure of 4 Bar to obtain coarse feedstock powders. Pr—Cu alloy powders were prepared in parallel to the Nd—La powders. Ingot with a composition of $Pr_{68}Cu_{32}$ (at %) was arc-melted, and then melt-spun at a wheel speed of 20 m/s. As-spun PrCu ribbons were ball milled for 15 hrs to obtain the PrCu powders.

The hydrogen-decrepitated coarse Nd—La powder was mixed with 7.5 wt % Pr—Cu powders, and then ball milled for 13 hrs to obtain fine powders with grain size 5+/−1 micron. The fine powders were filled in a rubber die, then magnetically aligned with a pulse magnetizer at 9 Tesla. The rubber die containing the aligned powder was then cold-isostatic-pressed (CIP) at a pressure of 500 MPa to obtain a green compact for sintering. The sintering process was carried out at a vacuum of $10^{-5}$ Torr at 1080° C. for 1.5 hrs. Afterward, the sintered magnet was sealed in a quartz ampule for multi-step post-annealing.

Figure 3:
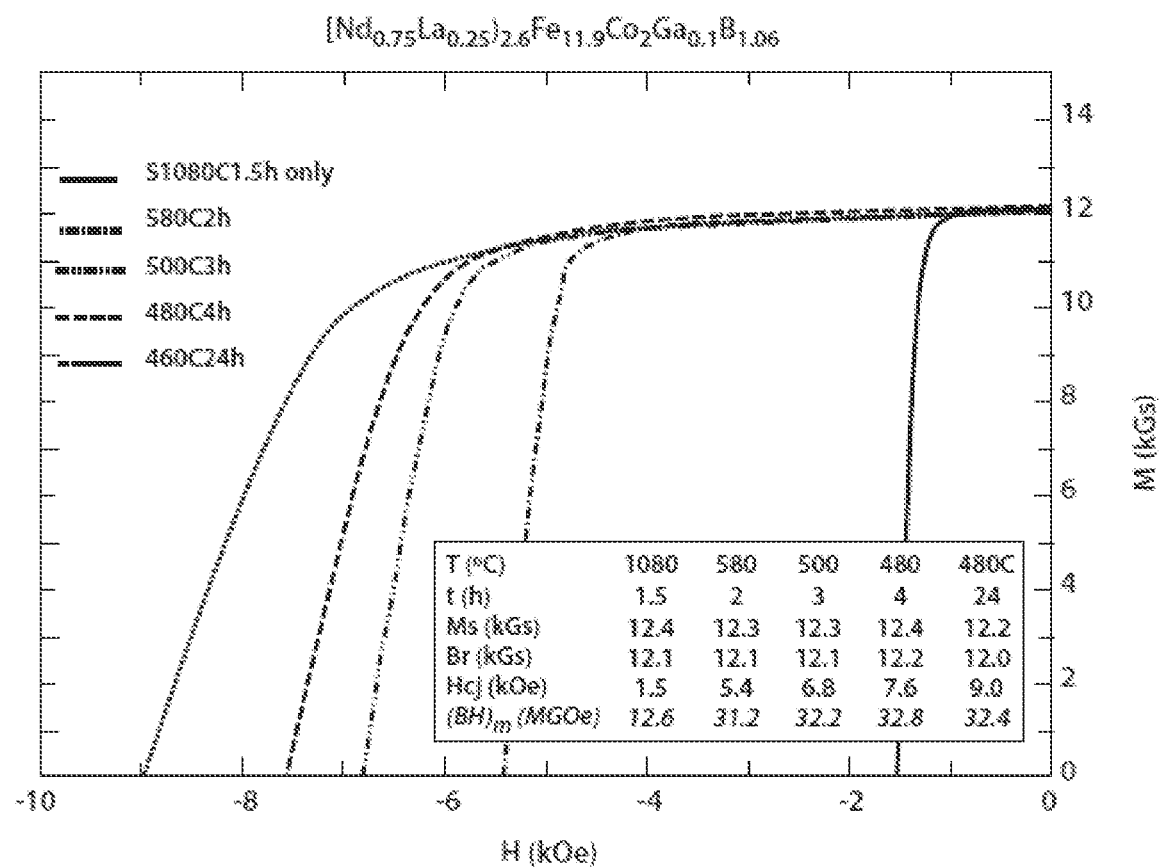
FIG. 3 Hysteresis loops for $(Nd_{0.75}La_{0.25})_{2.6}Ga_{0.1}Co_2Fe_{11.9}B_{1.06}$ magnet samples subjected to several heat treatments, ultimately attaining over 32 MG-Oe energy product.

After completing each annealing step, the magnet was measured for magnetic properties with a hysteregrapher then re-sealed into a quartz ampule for the next annealing step. FIG. 3 shows the demagnetization curves of the magnet after sintering and a series of post-annealing step. The gradual gain of coercivity implies the intergrain phases are being optimized, thus resulting in improved coercivity.

Results

Figure 1B:
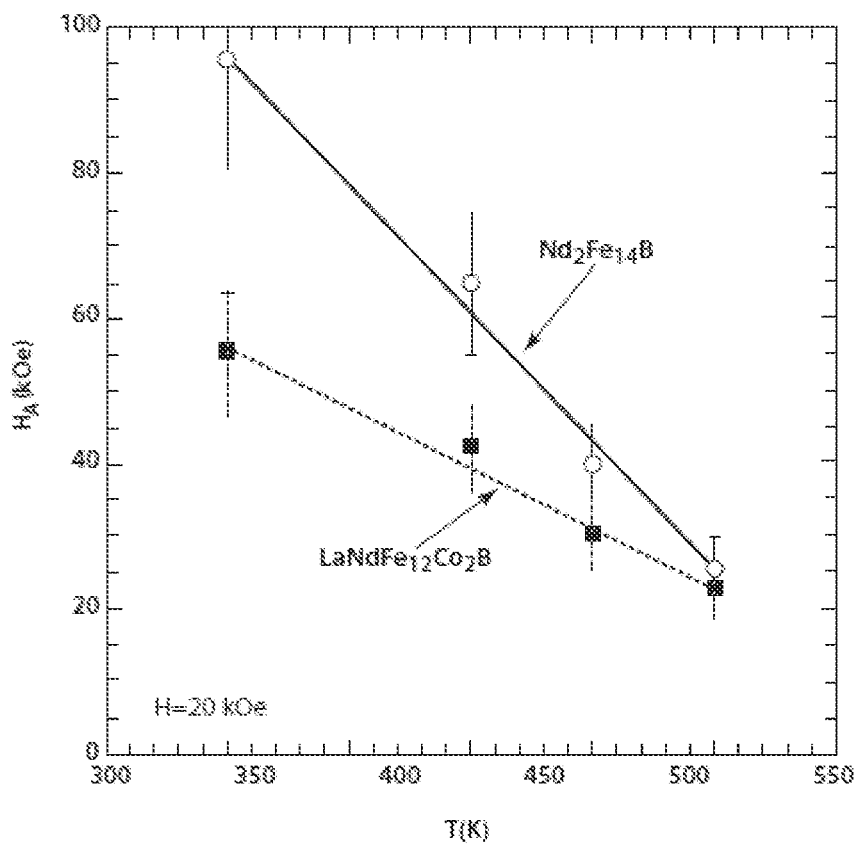

Presented in FIGS. 1A and 1B are measurements of the intrinsic properties of $LaNdFe_{12}Co_2B$ (a substituted alloy of the present invention) and $Nd_2Fe_{14}B$ (of the art). FIG. 1A shows temperature-dependent saturation magnetization while FIG. 1B shows the temperature-dependent anisotropy field of the two compositions. At 300 K, the magnetization of $LaNdFe_{12}Co_2B$, at 28.9 B/formula unit, is within 4 percent of the $Nd_2Fe_{14}B$ value (measured using the same method) of 30.2 µB/f.u. This means that the 300 K magnetization of $LaNdFe_{12}Co_2B$ is approximately 1.54 T, given the well-known $Nd_2Fe_{14}B$ value of 1.6 Tesla (M. Sagawa et al., *IEEE Transactions on Magnetics*, 20, 1584, 1984). The differences in anisotropy field $H_A$ are more substantial, given the general predominance of Nd in creating magnetic anisotropy in $Nd_2Fe_{14}B$. $H_A$ in $Nd_2Fe_{14}B$ is measured as 95 kOe at 300 K, while the value for $LaNdFe_{12}Co_2B$ is 55 kOe, or 42% smaller. However, when translated in terms of the "magnetic hardness parameter" $\kappa = (K_1/\mu_o M_s^2)^{0.5} = (H_A/2M_s)^{0.5}$, one finds that the x value for the substituted alloy, at 1.34, is still 78% of the 1.72 κ value observed for $Nd_2Fe_{14}B$, so that $LaNdFe_{12}Co_2B$ may still be considered as a rather hard magnetic material capable of offering substantial energy products $BH_{max}$ at significantly reduced Nd content.

At elevated temperatures, additional factors come into play. One main effect of the cobalt addition is to significantly raise the Curie point for the new composition to approximately 700 K from the 585 K value for $Nd_2Fe_{14}B$, which should lead to a weaker temperature dependence of the magnetic properties. Indeed, this is evident, since, at 500 K (an upper temperature limit for applications such as traction motors), the magnetization of the substituted compound, at 24.5 μB/f.u., has decreased only 15% from the 300 K value, while for $Nd_2Fe_{14}B$ itself the decrease is closer to 30%. Thus, the substituted alloy may have a weaker temperature dependence in the permanent magnet properties, such as energy product, which may permit supplanting current high temperature grades of $Nd_2Fe_{14}B$ with the presently described alloy. High temperature grades of $Nd_2Fe_{14}B$ often use several weight percent of the critical and extremely costly Dy to maintain high-temperature coercivity, but at a substantial penalty to room-temperature energy product.

As shown in FIG. 1B, there is also a weaker temperature dependence of the anisotropy field $H_A$ in the La- and Co-substituted alloy, with this quantity decreasing 56% from its 300 K value to 22 kOe at 500 K in that material, to be compared to the nearly 73% reduction in $Nd_2Fe_{14}B$ itself to 26 kOe. This difference coincides with the significantly higher Curie point of the substituted alloy.

Permanent Magnet Sample—1

Figure 2:
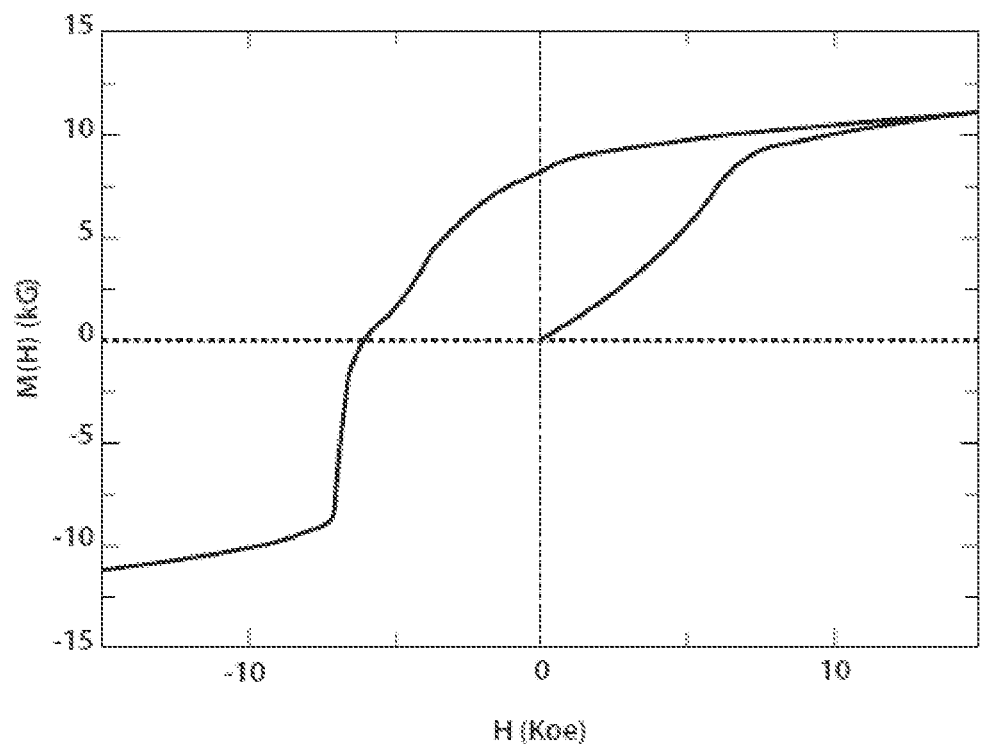
FIG. 2. Hysteresis loop for $LaNdFe_{12}Co_2B$ melt-spun ribbons annealed at 575° C. for 30 minutes.

Melt-spun ribbons of $LaNdFe_{12}Co_2B$ were annealed at a temperature of 575 K for periods of 15 and 30 minutes, and magnetic hysteresis loops were obtained via direct measurement, as shown in FIG. 2. As shown in FIG. 2, significant coercivities, as high as 6 kOe, were obtained, as indicated by the second quadrant demagnetization curves, with a remanence of 8.5 kG, leading to a significant energy product $BH_{max}$ of nearly 10 MG-Ge. As is apparent from FIG. 2, this is a rather substantial energy product given the relatively unoptimized state of this substituted alloy. For example, the 8.5 kG remanence is not even 60 percent of the 15.4 kG saturation magnetization value estimated from the measurements in the previous section. In addition, the hysteresis loop is far from the ideal rectangular shape and in fact is more triangular, and contains at least two distinct second-quadrant "kinks", suggestive of the presence of secondary phases. By reviewing the relevant phase diagrams, several low-temperature eutectics (of order 600° C.) of the various binaries, such as La—Co, are observed, which may indicate the presence of one or more secondary phases, such as LaCos.

Notably, for an 8.5 kG remanence, the maximum achievable energy product is just 18 MG-Ge, so that even in this relatively unoptimized state the alloy is still achieving over half of its maximum achievable energy product. An estimate of the potential performance of an optimized alloy may be made by noting that, in general, the achievable $BH_{max}$ is proportional to the square of the remanence, so that the same hysteresis loop, scaled to a remanence of 15.4 kG, would yield $BH_{max}$ values exceeding 30 MG-Ge. Energy products approaching 40 MG-Oe appear achievable, which are on par with commercially available grades of $Nd_2Fe_{14}B$.

Permanent Magnet Sample—2

Substantiating these results, FIG. 3 shows magnetic hysteresis loops on a related alloy, $(Nd_{0.75}La_{0.25})_{2.6}Ga_{0.1}Co_2Fe_{11.9}B_{1.06}$, which exhibits substantially reduced Nd usage relative to typical $Nd_2Fe_{14}B$-based magnets. These alloys were subjected to heat treatments of varying temperatures and durations, as indicated in FIG. 3, resulting in the achievement of an energy product of 32.4 MG-Oe for the sample heat-treated for 24 hours at 460 Celsius, along with a coercivity of 9.0 kOe. The energy product is thus competitive with some grades of $Nd_2Fe_{14}B$-based magnets and is at the upper end of the commercial range of SmCo-based magnets.

First Principles Calculations

The aim of the following experiments is to determine first principles calculations-based properties of the magnetic properties of both $Nd_2Fe_{14}B$ and the substituted $LaNdFe_{12}Co_2B$ alloy. For these calculations, the generalized gradient approximation (J. P. Perdew et al., *Physical Review Letters*, 77, 3865, 1996) was used, supplemented with a Hubbard U correction of 5 eV applied to the Nd 4f orbitals. These calculations used the all-electron, linearized augmented planewave density functional theory code WIEN2K (P. Blaha et al., Technische Universitat Wien, Vienna, 2001), in the experimental structure of (W. E. Wallace et al., *Journal of the Less Common Metals*, 130, 33, 1987), with internal coordinates optimized. For the substituted alloy, the virtual crystal approximation was used to model the effect of cobalt substitution for iron. For this latter calculation, the $Nd_2Fe_{14}B$ structure was retained, as the La and Co substitution generally offer compensating volume effects due to the lanthanide contraction (i.e. the larger size of La relative to Nd) and the smaller volume of cobalt relative to iron.

For the base alloy, a saturation magnetization, including orbital moments, of ca. 30.1 B/formula unit was observed, with this value increasing slightly to 31.3 μμB/f.u. for the substituted compound. These values are relatively close to those found experimentally at 300 K, although the agreement may be coincidental since at low temperature (as the first principles calculations describe) the value for $Nd_2Fe_{14}B$ is 38.5 μB/f.u. (J. F. Herbst, *Reviews of Modern Physics*, 63 (4), 819, 1991. It is known that small amounts of cobalt substitution in $Nd_2Fe_{14}B$ increase the room-temperature magnetization slightly, although the more important effect for permanent magnet purposes is the Curie temperature increase. In any case, these magnetization values are consistent with the present experimental data showing that there is no radical loss of magnetization associated with lanthanum substitution for neodymium. The discrepancies with known low-temperature values are likely due to the well-known difficulties of density functional theory in attaining a full, quantitatively accurate description of rare earth compounds, specifically due to the difficulty in describing the 4f electrons.

Nevertheless, despite these difficulties, the experimentally determined reduction in magnetic anisotropy associated with La substitution for Nd was found to be supported theoretically, with the calculated first magnetic anisotropy constant $K_1$ decreasing from 5.30 to 2.54 $MJ/m^3$ from $Nd_2Fe_{14}B$ to $LaNdFe_{12}Co_2B$. It is known that approximately three-quarters of the anisotropy in the base alloy derives from the Nd atoms, with the remaining one-quarter originating in the Fe sublattice, so the present calculation could reflect some rearrangement of anisotropy between these sublattices. In any case, the found value for $Nd_2Fe_{14}B$ is in reasonable accord with the 300 K value for $Nd_2Fe_{14}B$ of ca. 4.9 $MJ/m^3$, again recognizing that the agreement is somewhat coincidental. The theoretical results confirm both that the magnetization of these two alloys is quite close, as observed by experiment, and that the La substitution significantly decreases magnetic anisotropy.

Figure 4:
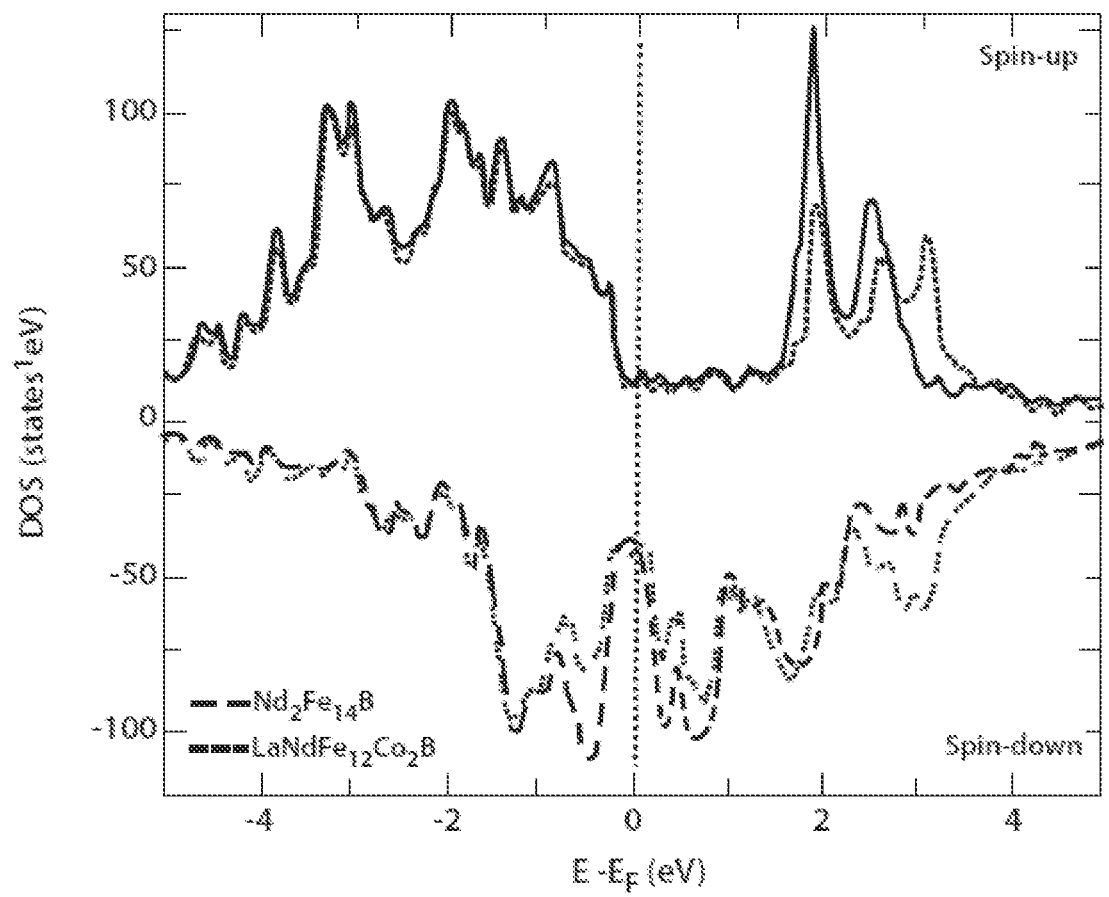
FIG. 4. Graph showing calculated densities-of-states (DOS) of $Nd_2Fe_{14}B$ and $LaNdFe_{12}Co_2B$.

FIG. 4 presents the calculated density-of-states (DOS) of both compounds. Surprisingly, the spin-up density-of-states below the Fermi level is essentially unaffected by the substitutions, while the spin-down magnitude is slightly decreased between −1 and 0 eV. It is this decrease in spin-down DOS that creates the slight increase in calculated magnetization for the substituted compound. The 4f-related peak at 2 eV is reduced by the substitution of La for Nd and is further split into three peaks, likely by the additional structural complexity associated with the substitutions considered here.

Discussion

Although only results for 25% and 50% substitution of Nd by La and an approximate 14% substitution of Fe by Co are herein presented, other related alloys with different substitution percentages are herein considered. In the base alloy, it is known that substitution of up to 15% of the Fe by Co (about the amount here) has no significant effect on magnetic anisotropy, while substitutions above this amount tend to reduce the anisotropy (Y. Matsuura et al., *Applied Physics Letters*, 46, 308, 1985). This, combined with the much higher cost and lower magnetization associated with further increased cobalt content, indicates that additional cobalt substitution into this alloy may not be of significant technological interest. The exemplified alloy has approximately 11 weight percent cobalt, and it is estimated that even if all motor vehicles sold in the United States were to use this magnet for tractive propulsion, only a few percent of the world cobalt supply of 140,000 tons per year would be consumed (*Mineral Commodity Summaries* 2021, United States Geological Survey, p. 50).

With regards to the lanthanum-for-neodymium substitution, o a whole series of alloys with differing La—Nd ratios may be produced, each at different price points and coercivity values, given that the Nd produces the majority of the magnetic anisotropy. Relative to Ce substitution, La substitution has the distinct advantage that it impacts the Curie point far less, i.e., the Curie point of pure $La_2Fe_{14}B$, at 530 K, is nearly 100 K higher than the 433 K value for $Ce_2Fe_{14}B$. The relative disadvantage of La is its minimal contribution to magnetic anisotropy in view of it lacking 4f electrons, unlike Ce, which possesses a single 4f electron.

While there have been shown and described what are at present considered the preferred embodiments of the invention, those skilled in the art may make various changes and modifications which remain within the scope of the invention defined by the appended claims.

What is claimed is:

1. A permanent magnetic composition comprising the formula:

$$(La_xM_yNd_{1-x-y})_rFe_vM'_zCo_{14-v-z}B_w \quad (1)$$

wherein $0.1 \leq x < 1$, $11 \leq v \leq 12.2$, $0.01 \leq y \leq 0.3$, $0.25 \leq z \leq 0.5$, $1.9 \leq r \leq 3$, $0.1 \leq (x+y) < 1$, $11 \leq (v+z) \leq 12.2$, and $1.0 \leq w \leq 1.1$, wherein M represents one or more lanthanide elements other than La and Nd, and at least one of the lanthanide elements in M is Pr, and M' represents one or more transition metal elements other than Fe and Co and/or M' represents one or more main group elements selected from Groups 13 and 14 of the Periodic Table other than B, provided that M' includes at least one of Cu and Ga, wherein the numerical values given above are molar amounts.

2. The composition of claim 1, wherein $1.9 \leq r \leq 2.6$.
3. The composition of claim 1, wherein $1.9 \leq r \leq 2.2$.
4. The composition of claim 1, wherein $r=2$.
5. The composition of claim 1, wherein $0.25 \leq x \leq 0.75$ and $1.9 \leq r \leq 2.6$.
6. The composition of claim 1, wherein $0.25 \leq x \leq 0.75$ and $1.9 \leq r \leq 2.2$.
7. The composition of claim 1, wherein $0.4 \leq x \leq 0.6$ and $1.9 \leq r \leq 2.6$.
8. The composition of claim 1, wherein $0.4 \leq x \leq 0.6$ and $1.9 \leq r \leq 2.2$.
9. The composition of claim 1, wherein $11.8 \leq v \leq 12.2$.
10. The composition of claim 1, wherein M' comprises Cu.
11. The composition of claim 1, wherein Dy is excluded.
12. The composition of claim 1, wherein Ce is excluded.
13. The composition of claim 1, wherein $11 \leq (v+z) \leq 12$.
14. The composition of claim 1, wherein $0.1 \leq y \leq 0.3$.
15. The composition of claim 1, wherein M' includes both Cu and Ga.
16. A permanent magnetic composition consisting of the formula:

$$(La_xM_yNd_{1-x-y})_rFe_vM'_zCo_{14-v-z}B_w \quad (1)$$

wherein $0.1 \leq x < 1$, $11 \leq v \leq 12.2$, $0.01 \leq y \leq 0.3$, $0.25 \leq z \leq 0.5$, $1.9 \leq r \leq 3$, $0.1 \leq (x+y) < 1$, $11 \leq (v+z) \leq 12.2$, and $1.0 \leq w \leq 1.1$, wherein M represents one or more lanthanide elements other than La and Nd, and at least one of the lanthanide elements in M is Pr, and M' represents one or more transition metal elements other than Fe and Co and/or M' represents one or more main group elements selected from Groups 13 and 14 of the Periodic Table other than B, provided that M' includes at least one of Cu and Ga, wherein the numerical values given above are molar amounts.

* * * * *